US012808733B2

(12) United States Patent
Zeng et al.

(10) Patent No.: US 12,808,733 B2
(45) Date of Patent: Nov. 24, 2026

(54) HIGH ACCURACY BI-CIRCUIT WHEEL LOAD SENSOR

(71) Applicant: Transportation Technology Center, Inc., Pueblo, CO (US)

(72) Inventors: Yuqing Zeng, Pueblo, CO (US); Matthew Ward Witte, Tecumseh, MI (US)

(73) Assignee: Transportation Technology Center, Inc., Pueblo, CO (US)

( * ) Notice: Subject to any disclaimer, the term of this patent is extended or adjusted under 35 U.S.C. 154(b) by 250 days.

(21) Appl. No.: 18/947,220

(22) Filed: Nov. 14, 2024

(65) Prior Publication Data

US 2025/0155299 A1 May 15, 2025

Related U.S. Application Data

(60) Provisional application No. 63/599,045, filed on Nov. 15, 2023.

(51) Int. Cl.
*G01L 1/22* (2006.01)
*G01L 25/00* (2006.01)

(52) U.S. Cl.
CPC ............ *G01L 1/2262* (2013.01); *G01L 25/00* (2013.01)

(58) Field of Classification Search
CPC .............................. G01L 25/00; G01L 1/2262
See application file for complete search history.

(56) References Cited

U.S. PATENT DOCUMENTS

| | | | | |
|---|---|---|---|---|
| 3,853,000 A * | 12/1974 | Barnett | G01L 1/22 | 33/DIG. 13 |
| 4,332,174 A * | 6/1982 | Suzuki | G01G 3/1404 | 73/862.633 |
| 4,701,855 A | 10/1987 | Harrison et al. | | |
| 5,174,159 A * | 12/1992 | Jacobsen | G01B 7/16 | 73/777 |
| 6,675,077 B2 * | 1/2004 | Dembosky | B61F 5/383 | 701/19 |
| 7,536,919 B2 * | 5/2009 | Powlesland | G01L 1/18 | 73/777 |
| 8,650,966 B2 * | 2/2014 | McMillan | G01B 7/20 | 73/767 |
| 10,745,037 B2 * | 8/2020 | Zeng | B61L 23/04 | |

* cited by examiner

*Primary Examiner* — Francis C Gray
(74) *Attorney, Agent, or Firm* — Cochran Freund & Young LLC

(57) ABSTRACT

A wheel load sensor system has two independent shear load sensing circuits, a wide circuit and a narrow circuit, that are fixed along the neutral axis of the rail in the span between ties. The responses of both circuits are initially calibrated by applying known loads at predetermined points along the span to generate sensitivity curves from each circuit. This configuration allows the present system to account for the longitudinal position of the load applied within the crib based on the ratio of the response signals from the two circuits. This ratio can be used to accurately determine the location of the wheel load within the crib. The magnitude of the load can then be calculated from the sensitive curve for either circuit.

13 Claims, 5 Drawing Sheets

HIGH ACCURACY BI-CIRCUIT WHEEL LOAD SENSOR

RELATED APPLICATION

The present application is based on and claims priority to the Applicant's U.S. Provisional Patent Application 63/599,045, entitled "High Accuracy Bi-Circuit Wheel Load Sensor," filed on Nov. 15, 2023.

BACKGROUND OF THE INVENTION

Field of the Invention

The present invention relates generally to the field of wheel load sensors used in the railroad industry. More specifically, the present invention discloses a wheel load sensor system having two independent shear load sensing circuits with different spacings (i.e., one circuit have wide spacing and the other circuit having narrow spacing) fixed along the neutral axis of the rail in the span between ties.

Statement of the Problem

Wheel load sensors have been used for many years in the railroad industry to measure wheel impact loads at the wheel/rail (W/R) interface. The prior art in this field includes both systems on board the train and systems for in-track measurement. In theory, on-board and wayside W/R force measurements should be identical because they are a pair of action and reaction forces. But, this has not been achieved in the past, especially for W/R impact forces. Previously, due to the low accuracy of wayside W/R force measurements and the difficulty of obtaining continuous results, the on-board measurement results have generally been used as the standard. This inability to obtain consistent results has also led to corresponding inconsistent safety evaluation standards for on-board and wayside measurement. Accurate measurement of the W/R dynamic loads therefore remains an ongoing concern.

Solution to the Problem

Experimental results using the present invention have shown that the on-board and wayside wheel/rail vertical force measurements can obtain consistent results. Thus, the present system provides an improved means to benchmark W/R dynamic load measurement at the wheel/rail interface, including impact loads. In particular, the present system can be used to precisely determine the dynamic load state, including the longitudinal position of the load on the rail and the magnitude of the dynamic peak at the moment the load was applied. This is critical for accurately determining wheel dynamic loading with respect to vehicle performance and derailment evaluation, as well as wheel position for determining the axle angle of attack and improving lateral force measurement.

SUMMARY OF THE INVENTION

This invention provides a wheel load sensor system having two independent shear load sensing circuits (also known as differential shear circuits) with different spacings. One circuit has wide spacing and the other circuit having narrow spacing. Both circuits are fixed along the neutral axis of the rail in the span between ties. The responses of both circuits are initially calibrated by applying known loads at predetermined points along the span to generate sensitivity curves from each circuit. A ratio curve is calculated from the response signals from the two circuits that is related only to the longitudinal position of load applied within the crib. Based on this ratio curve, the position of a wheel load in the crib can be determined. The magnitude of the load can then be calculated from the sensitivity curve for either circuit, although the wide circuit provides better results.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
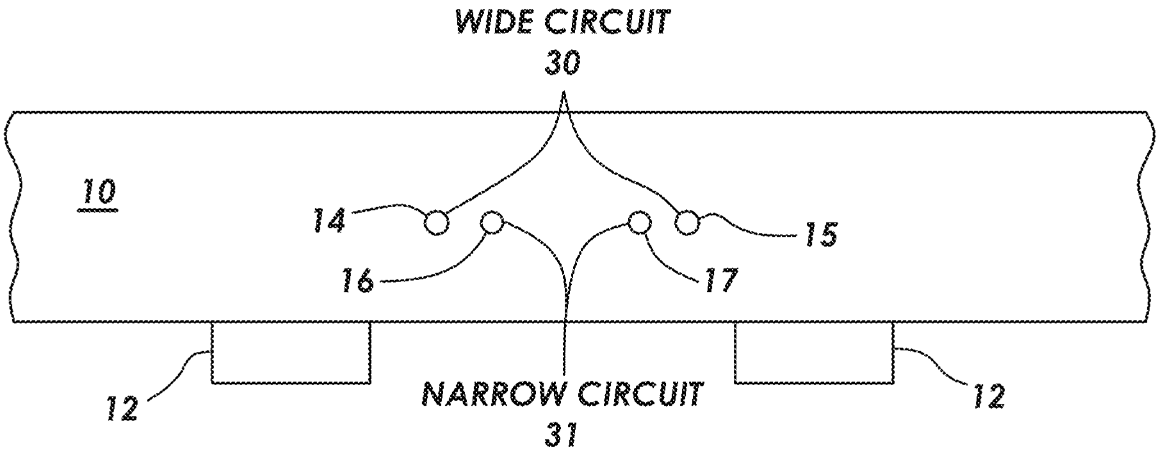
FIG. 1 is a simplified side view showing two sets of wide circuit strain gauges 14, 15 and narrow circuit strain gauges 16, 17 attached to a rail 10.

FIG. 1 shows two shear load sensing circuits (a wide spacing circuit 30 and a narrow spacing circuit 31) fixed along the neutral axis of a rail 10 in the span between two ties 12. The wide spacing circuit (or wide circuit) 30 has at least two strain gauges 14 and 15 spaced apart from one another by a predetermined longitudinal distance. Similarly, the narrow spacing circuit (or narrow circuit) 31 has at least two strain gauges 16 and 17 spaced apart from one another by a substantially smaller longitudinal distance, and located between the wide strain gauges 14, 15. All of these strain gauges 14-17 are preferably aligned along the neutral axis of the rail 10. The symmetric arrangement and location of the strain gauge circuits 30, 31 along the neutral axis of the rail 10 results in a similar frequency response to dynamic loads for both the wide and narrow circuits.

Figure 2:
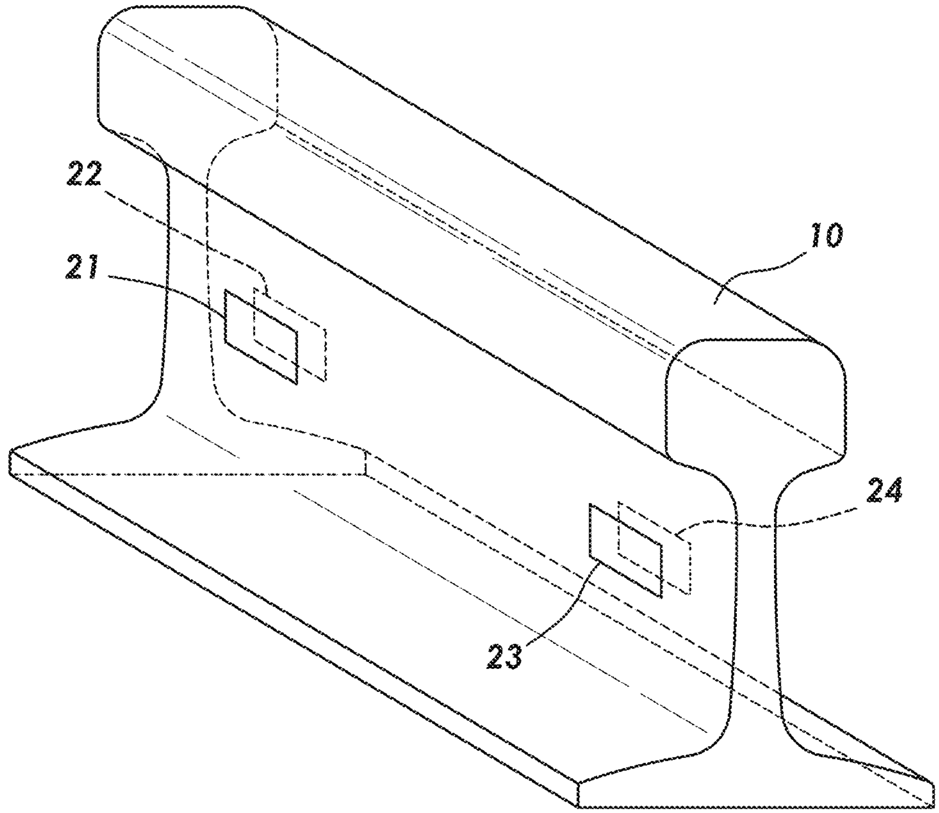
FIG. 2 is a corresponding axonometric view of a rail 10 and the configuration of a single circuit.

Preferably, each circuit 30, 31 is a conventional four-gauge bridge with two pairs of strain gauges opposing each other on opposite sides of the rail 10. This enables accurate measurement of small changes in resistance as loads are applied to the rail 10, and the effects of lateral forces and lateral contact position are negligible. FIG. 2 depicts a conventional rail 10 with one circuit having two pairs of strain gauges 21-24 opposing each other on opposite sides of the rail 10 with a predetermined longitudinal distance between the pairs of strain gauges 21, 22 and 23, 24.

Alternatively, each circuit could have two or more load sensors in other configurations.

Figure 4:
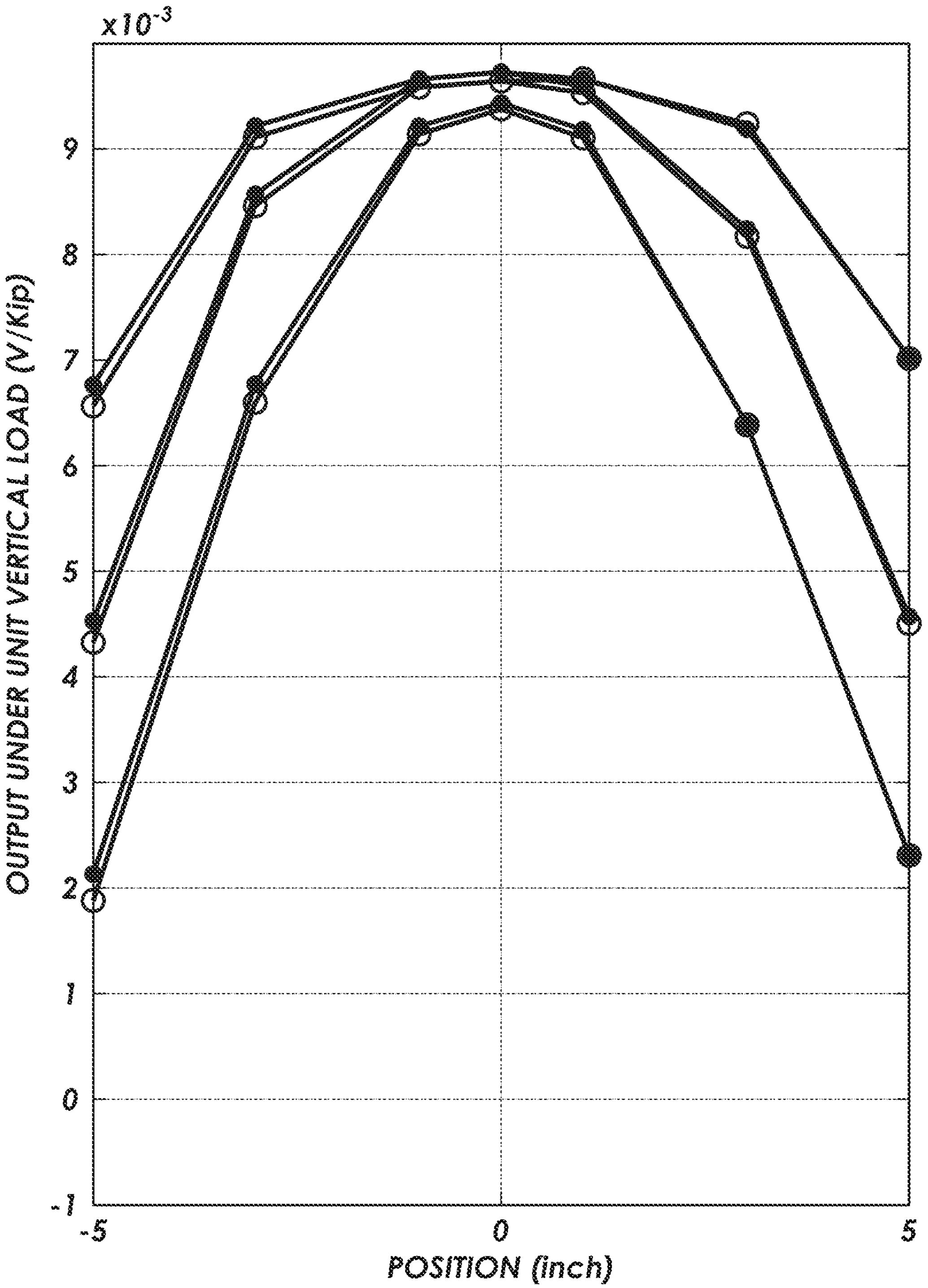
FIG. 4 is a graph showing the sensitivity curves 40-42 for three sets of strain gauges with different spacings as a function of the position of a unit load along the rail 10.

The wide and narrow circuits 30, 31 can be wired and sampled independently. Preferably, the wide circuit and narrow circuit 30, 31 are calibrated simultaneously by applying known loads (e.g., a unit load) at various points along the span. A resulting sensitivity curve is measured and recorded for each circuit as a function of the location of a unit load along the rail 10. Examples of these sensitivity curves 40-42 for three circuits with different longitudinal spacings are shown in FIG. 4.

Figure 5:
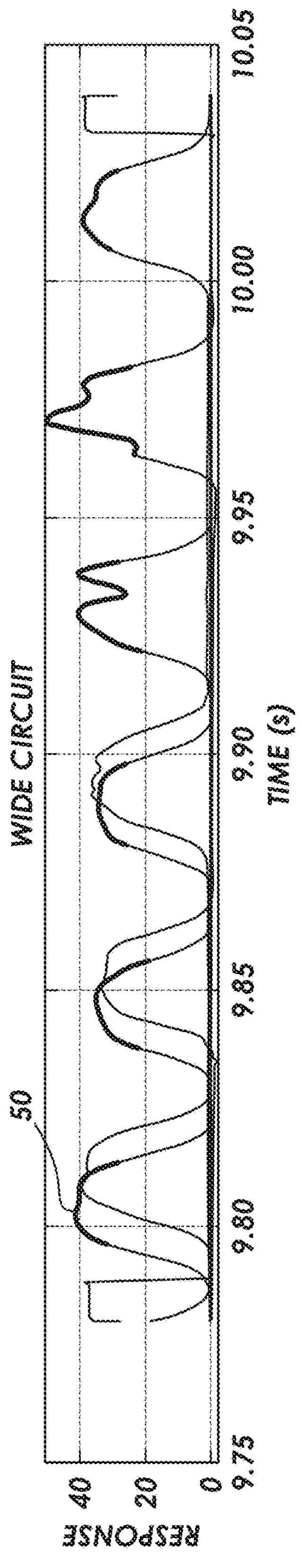
FIG. 5 is a graph showing the response curves 50 for the wide circuit as a function of the position of a test load over six cribs.
Figure 6:
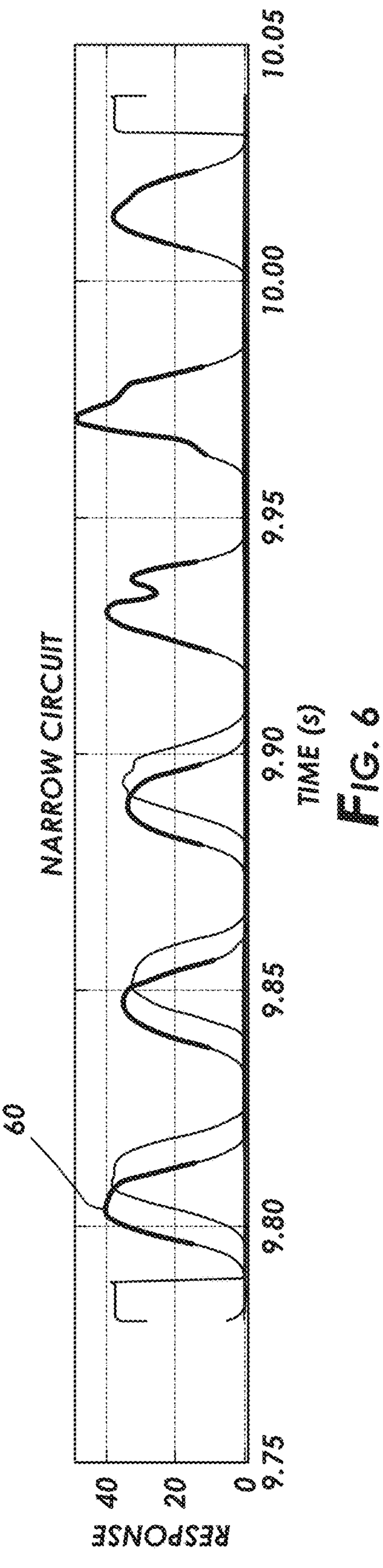
FIG. 6 is a graph corresponding to FIG. 5 showing the response curves 60 for the narrow circuit as a function of the position of a test load over six cribs.

Based on the sensing mechanism, the response curves of the wide and narrow circuits 30, 31 are equal to the vertical load curve multiplied by the related sensitivity curve at each point along the rail. FIG. 5 shows examples of the response curves 50 for the wide circuit 30 as a function of the position of a test load over six cribs. FIG. 6 shows corresponding examples of the response curves 60 for the narrow circuit 31.

These response curves 50, 60 are highly sensitive to both the vertical load and the longitudinal contact position of the applied load in the crib. Therefore, although the configuration of the six cribs is substantially the same, the curves 50, 60 for each crib are not the same due to changes in the vertical load. Due to the closely-related nature of the sensitivity curves and other response curves, it should be understood that these are readily interchangeable. For the purposes of this application and accompanying claims, the term "sensitivity curve" should be broadly construed as including sensitivity curves and/or other response curves.

A fixed relationship can be developed between the response curves 50, 60 from each circuit based on the sensing mechanism. In particular, a measured ratio curve 70 can be calculated based on the ratio of the response curves 50, 60 of the wide and narrow circuits (e.g., by dividing the narrow circuit response curve 60 by the wide circuit response curve 50) for calibration of the present system. This is also referred to as the "ratio" in FIG. 7.

A reference ratio curve can also be calculated based on the ratio of the sensitivity curves of the wide and narrow circuits (e.g., by dividing the narrow circuit sensitivity curve by the wide circuit sensitivity curve). Compared with the response curves 50 and 60, the measured ratio curve 70 is close to the reference ratio curve and is only sensitive to the longitudinal contact position of the applied load. Therefore, the curves for each crib in the ratio curve 70 are very similar due to the same configuration.

Figure 7:
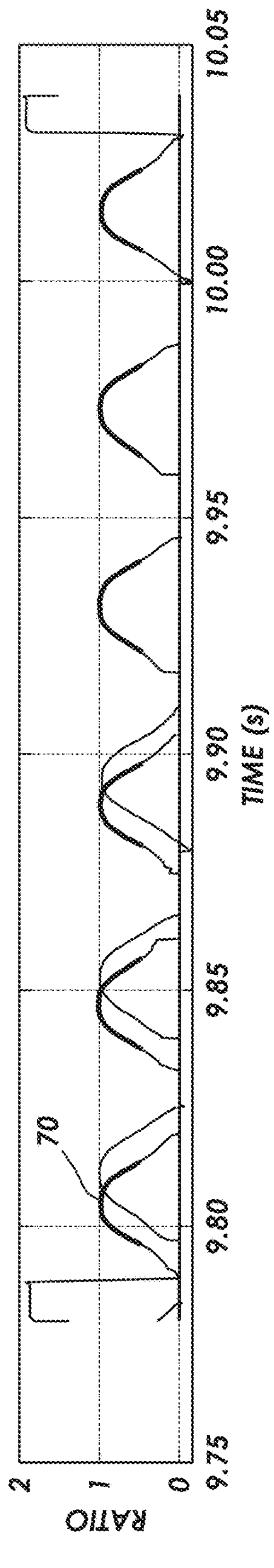
FIG. 7 is a graph corresponding to FIGS. 5 and 6 showing the resulting measured ratio curves 70 (narrow circuit response/wide circuit response) as a function of the position of a test load over six cribs.

Once in service after initial calibration, the fixed relationship between the response curves 50, 60 of the circuits provide by the reference ratio curve remains constant within a range of loading frequencies. A passing train results in a dynamic load state that varies based on position as the wheel traverses the span, and magnitude due to railcar dynamics and tread irregularities. The fixed relationship between the response curves 50, 60 of the circuits can be used to determine the location of the applied load along the span based on the output signals from the circuits. In particular, the ratio of the response of the narrow circuit (response curve 60 in FIG. 6) divided by the response of the wide circuit (response curve 50 in FIG. 5) at each location along the response curves 50, 60 defines a measured ratio curve 70 that is a substantially fixed relationship, as shown in FIG. 7.

Here again, due to the closely-related nature of the reference ratio curve and measured ratio curve, it should be understood that these are largely interchangeable. For the purposes of this application and accompanying claims, the term "ratio curve" should be broadly construed as including the reference ratio curve and/or the measured ration curve.

Once the location of the load is known, the magnitude of the load force can be calculated based on the response curves 50, 60 and/or related sensitivity curves 40-42 of the wide circuit or the narrow circuit for that location. The wide circuit is preferred since it provides better sensitivity. The final result is a precisely known dynamic load state regarding the longitudinal position on the rail 10 and the magnitude of the dynamic peak at the moment the load was applied.

Figure 8:
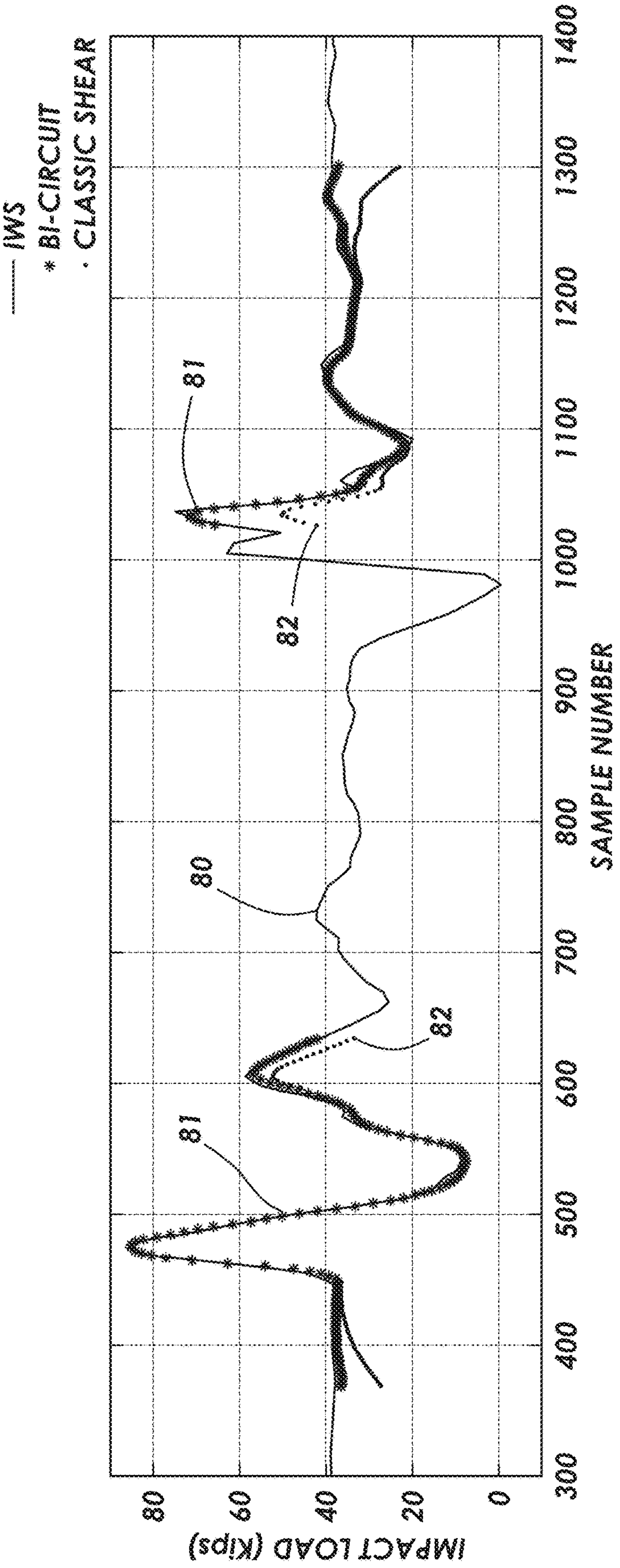
FIG. 8 is a graph showing the impact loads measured over two cribs by the present wayside system and an on-board instrumented wheelset (IWS).

FIG. 8 compares the impact loads measured by a conventional on-board high-accuracy instrumented wheelset (IWS) (curve 80), the present wayside system (curve 81), and the classic shear method (curve 82). The similarity between the IWS curve 80 and present invention in curve 81 is significantly better than between the IWS curve 80 and curve 82. Compared with the classic shear circuit, the impact loads measured by the present wayside system and IWS agree with each other very well, especially at the peak values (e.g., sample number 1030).

Alternatively, the responses of the circuits 30, 31 can each be viewed as a function of two variables—the location and magnitude of the applied load. These two equations with two unknowns can be solved simultaneously to determine the location and magnitude of the applied load. Other alternative algorithms are also possible.

Figure 3:
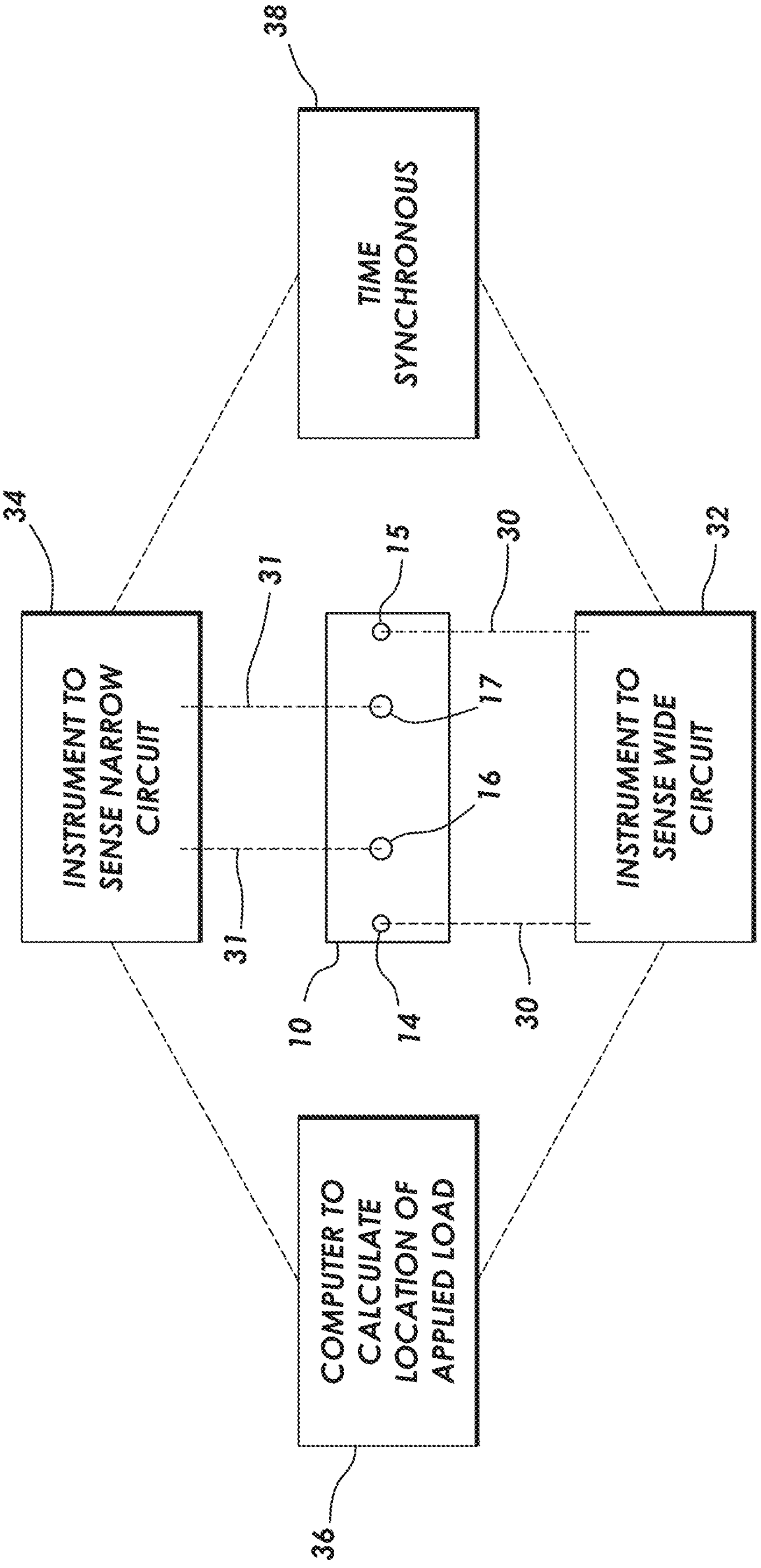
FIG. 3 is a block diagram of the present system.

FIG. 3 is a system block diagram of one possible embodiment of the present system. As previously discussed, the wide circuit 30 with strain gauges 14, 15 and the narrow circuit 31 with strain gauges 16, 17 sense the load applied to the rail 10. A computer 36 calculates the location and magnitude of the applied load from stored response and calibration curves 50-70 as described above. Time synchronization 38 between the instruments 34, 32 used to sense the narrow and wide circuits ensures the data supplied to the computer 36 are synchronous.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A method of measuring wheel/rail loads comprising:

providing a shear load sensing circuit (wide circuit) having at least two strain gauges spaced apart from one another by a predetermined longitudinal distance along the neutral axis of a rail in the span between two ties;

providing a shear load sensing circuit (narrow circuit) having at least two strain gauges spaced apart from one another by a smaller predetermined longitudinal distance along the neutral axis of the rail in the span between two ties, wherein the strain gauges of the narrow circuit are located between the strain gauges of the wide circuit;

calibrating the responses of the wide circuit and narrow circuit by applying known loads at predetermined points along the span; and determining the magnitude of an unknown load on the rail based on the calibration responses of the wide circuit and narrow circuit.

2. The method of claim 1 wherein the wide and narrow circuits each comprise four strain gauges in a bridge configuration.

3. The method of claim 2 wherein the wide and narrow circuits each comprise two pairs of strain gauges on opposite sides of the rail.

4. The method of claim 1 wherein calibration of the responses of the wide and narrow circuits further comprises generating sensitivity curves for the wide circuit and narrow circuit as a function of the location of a known load along the span.

5. The method of claim 4 further comprising calculating a ratio curve based on the ratio of the sensitivity curves for the wide circuit and narrow circuit.

6. The method of claim 5 wherein the magnitude of an unknown load is determined by:
determining the location of the unknown load along the span based on the ratio curve; and
determining the magnitude of the unknown load based on a sensitivity curve and the location of the load along the span.

7. The method of claim 6 wherein the magnitude of the unknown load is determined based on the location of the unknown load and the sensitivity curve of the wide circuit.

8. A method of measuring wheel/rail loads comprising:
providing a shear load sensing circuit (wide circuit) having at least two strain gauges spaced apart from one another by a predetermined longitudinal distance along the neutral axis of a rail in the span between two ties;
providing a shear load sensing circuit (narrow circuit) having at least two strain gauges spaced apart from one another by a smaller predetermined longitudinal distance along the neutral axis of the rail in the span between two ties, wherein the strain gauges of the narrow circuit are located between the strain gauges of the wide circuit;
calibrating the responses of the wide circuit and narrow circuit by applying known loads at predetermined points along the span to generate sensitivity curves for the wide circuit and narrow circuit as a function of the location of the known load along the span;
calculating a ratio curve based on the ratio of the sensitivity curves for the wide circuit and narrow circuit; and
determining the location and magnitude of an unknown load on the rail by:
(a) determining the location of the unknown load along the span based on the ratio curve; and
(b) determining the magnitude of the unknown load based on a sensitivity curve and the location of the load along the span.

9. The method of claim 8 wherein the wide and narrow circuits each comprise four strain gauges in a bridge configuration.

10. The method of claim 9 wherein the wide and narrow circuits each comprise two pairs of strain gauges on opposite sides of the rail.

11. The method of claim 8 wherein the ratio curve is calculated by dividing the sensitivity curve for the narrow circuit by the sensitivity curve for the wide circuit at points along the span.

12. The method of claim 8 wherein the magnitude of the unknown load is determined based on the location of the unknown load, and the sensitivity curve of the wide circuit.

13. A method of measuring wheel/rail loads comprising:
providing a shear load sensing circuit (wide circuit) having at least two pairs of strain gauges on opposite sides of the rail spaced apart from one another by a predetermined longitudinal distance along the neutral axis of a rail in the span between two ties, said strain gauges arranged in a bridge configuration;
providing a shear load sensing circuit (narrow circuit) having at least two pairs of strain gauges on opposite sides of the rail spaced apart from one another by a smaller predetermined longitudinal distance along the neutral axis of the rail in the span between two ties, wherein the strain gauges of the narrow circuit are located between the strain gauges of the wide circuit;
calibrating the responses of the wide circuit and narrow circuit by applying known loads at predetermined points along the span to generate sensitivity curves for the wide circuit and narrow circuit as a function of the location of the known load along the span;
calculating a ratio curve based on the ratio of the sensitivity curve for the wide circuit divided by sensitivity curve of the narrow circuit; and
determining the location and magnitude of an unknown load on the rail by:
(a) determining the location of the unknown load along the span based on the ratio curve; and
(b) determining the magnitude of the unknown load based on the sensitivity curve of the wide circuit and the location of the load along the span.

* * * * *